United States Patent

[11] 3,599,105

[72] Inventors Donald E. Weir Harbor City; Thomas D. Wright, Fountain Valley, both of, Calif.
[21] Appl. No. 846,301
[22] Filed July 24, 1969
[45] Patented Aug. 10, 1971
[73] Assignee Hughes Aircraft Company Culver City, Calif.

[54] AMPLITUDE DISCRIMINATOR WITH AN ADAPTIVE THRESHOLD
8 Claims, 3 Drawing Figs.

[52] U.S. Cl. .......... 328/146, 328/151
[51] Int. Cl. .......... H03k 5/00, H03k 17/00
[50] Field of Search .......... 328/146, 150, 151, 159

[56] References Cited

UNITED STATES PATENTS

| | | | |
|---|---|---|---|
| 3,183,446 | 5/1965 | Richman .......... | 328/146 |
| 3,388,266 | 6/1968 | Kjar .......... | 328/150 |
| 3,448,291 | 6/1969 | Burk et al. .......... | 328/151 |

*Primary Examiner*—Rodney D. Bennett, Jr.
*Assistant Examiner*—S. C. Buczinski
*Attorneys*—James K. Haskell and Walter J. Adam

ABSTRACT: An amplitude discriminator which includes a peak detector with a fixed selected discharge rate and which charges up to the peak amplitude of a first input signal, and to the peak amplitude of any subsequent input signal, whose peak amplitude exceeds the amplitude of peak detector's output. A selected percentage of the amplitude of the peak detector output is fed to a comparator, which compares the percentage amplitude with the amplitude of each input signal and provides an output signal of a first binary level only when the amplitude of the input signal is not less than the selected percentage of the peak detector output. An incorporated hold circuit is triggered by the comparator output signal of the first binary level to maintain the percentage of the amplitude of the peak detector output which is supplied to the comparator constant during the comparison duration.

INVENTORS.
DONALD E. WEIR,
THOMAS D. WRIGHT,
BY J. K. Haskell
ATTORNEY.

AMPLITUDE DISCRIMINATOR WITH AN ADAPTIVE THRESHOLD

The invention herein described was made in the course of or under a contract or subcontract thereunder, with the U.S. Navy.

BACKGROUND OF THE INVENTION

1. Field of the Invention

The present invention relates to an amplitude or level discriminator and, more particularly, to a discriminator circuit which utilizes previously read amplitudes in its operation.

2. Description of the Prior Art

There are many target detection systems in which detected targets are indicated by the amplitudes of the voltage signals which the targets present to the detection system. In such a system it is often desirable to select the signals with strong or high-voltage amplitudes, which are assumed to represent meaningful targets, and reject less significant targets, which are represented by signals with weak or low-voltage amplitudes. Conventional automatic gain control (AGC) techniques are not satisfactory in attempting to accomplish the desired separation between meaningful targets and those to be rejected. It has been discovered that very satisfactory target separation may be accomplished by a voltage amplitude or level discriminator, in which discrimination is partially based on previously read voltage amplitudes.

OBJECTS AND SUMMARY OF THE INVENTION

It is a primary object of the present invention to provide a new improved voltage level discriminator.

Another object of the present invention is to provide a discriminator circuit which produces output signals as a function of the history of the voltage levels of input signals, supplied thereto.

A further object of the present invention is to provide a relatively simple, highly reliable circuit to which input signals of varying voltage amplitudes are supplied and which provides an output signal in response to any input signal only if the voltage amplitude of the particular input signal exceeds a preselected percentage of a control voltage amplitude, the latter being a function of the peak amplitudes of previous received input signals and a selected discharge rate.

These and other objects of the present invention are achieved by providing a discriminator circuit with a positive peak detector to which each input signal is applied. The peak detector is selected to have a discharge rate which once chosen remains fixed. The peak detector charges up to the peak amplitude of the first input signal. Thereafter, it charges up to the peak amplitude of any subsequent input signal if, when the subsequent input signal is received, the detector's output is less than the peak amplitude of the subsequent input signal. Thus, during operation the amplitude of the output of the peak detector is a function of the peak amplitudes of previously received input signals. As used herein, the term amplitude refers to a voltage signal level or amplitude.

The novel discriminator includes a voltage comparator to which each input signal and a selected percentage of the amplitude of the peak detector output are supplied. The comparator provides a digital output which is of a first level, e.g. a high level, which may be thought of as a binary 1, when 32. amplitude of the input signal is not less than the selected percentage of the amplitude of the peak detector output. However, if the latter-mentioned amplitude is greater than the amplitude of the input signal, the comparator output is of a second level, e.g., a low level which may be regarded as a binary 0.

Preferably, the discriminator includes a sample and hold unit, interposed between the peak detector and the comparator. This unit is triggered by a binary 1 comparator output to hold constant the percentage of the amplitude of the peak detector output which is supplied to the comparator, during the comparison duration. In noisy signal environments the input to the peak detector may be chosen to be the input signal amplitude minus a selected preset threshold level or amplitude, while the comparator may be made to provide a binary 1 output only when the input signal amplitude equals or exceeds the total amplitude of the preselected threshold amplitude plus the preselected percentage of the peak detector output amplitude.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
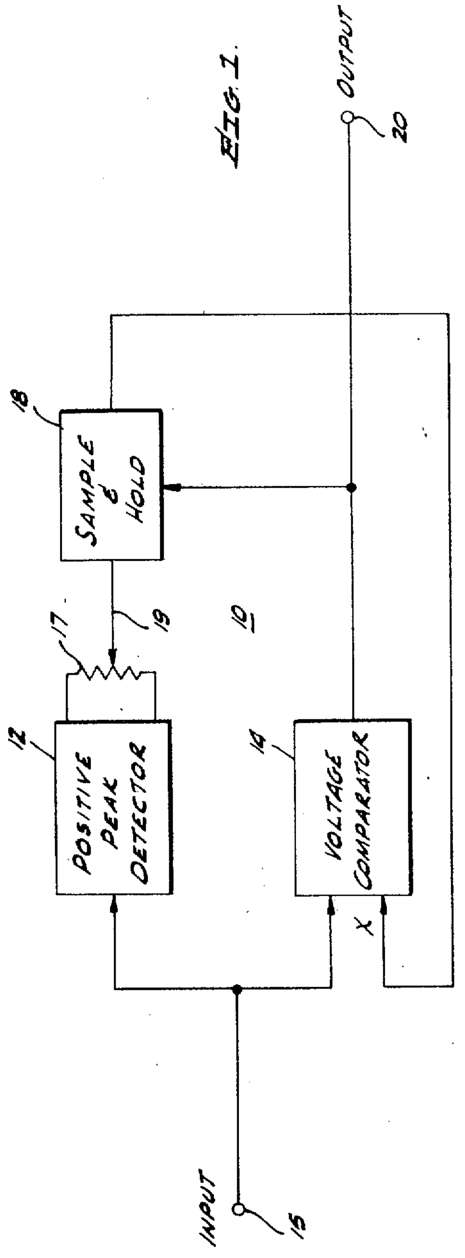
FIG. 1 is a simple block diagram of one embodiment of the invention.

Reference is now made to FIG. 1, wherein reference numeral 10 designates one embodiment of the novel discriminator of the present invention. The discriminator is shown comprising a positive peak detector 12 and a voltage comparator 14, each of which is connected to an input terminal 15, at which input signals are assumed to be applied. The output of the positive peak detector 12 is impressed across an output resistor 17. The resistor is tapped at a selected point to provide a percentage of the amplitude of detector output to a sample and hold unit 18, whose output is supplied to another input of the voltage comparator 14. The output of the comparator 14 is connected to an output terminal 20, which represents the output terminal of the discriminator 10.

Figure 2:
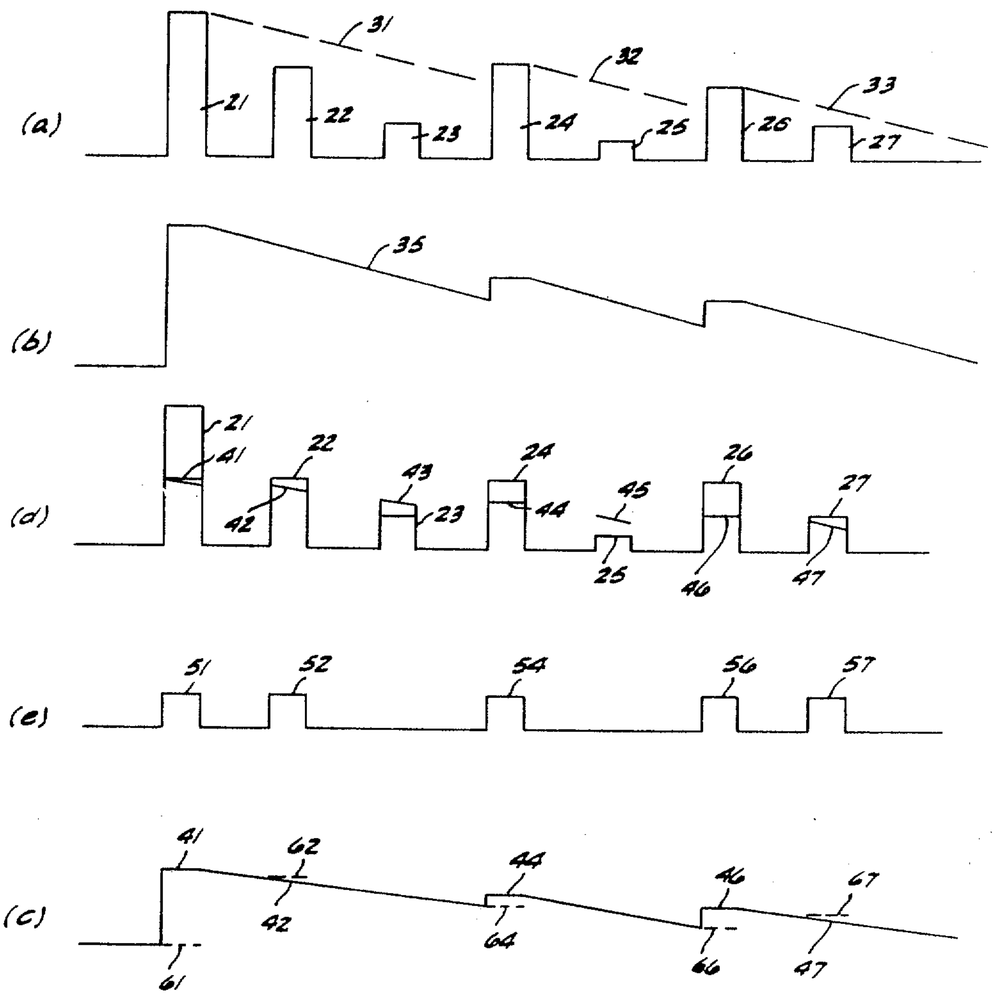
FIG. 2 is a multiline waveform diagram, useful in explaining the embodiments of the present invention.

In the operation of the discriminator may best be explained in conjunction with the multiwaveform shown on lines *a* through *e* of FIG. 2, to which reference is now made. In FIG. 2, line *a*, reference numerals 21 through 27 designate a succession of seven input signals assumed to be applied at input terminal 15. For explanatory purposes only, the input signals are shown as square signals of different amplitudes which are positive with respect to a reference potential, such as zero or ground. These input signals are supplied to both the detector 12 and the comparator 14.

In operation, the peak detector 12 responds to the first input signal 21 and charges up to the peak amplitude of signal 21. The peak detector has a fixed preselected discharge rate, represented by the slopes of lines 31—33. The detector responds to each subsequent input matching and charges up to the peak amplitude of such input signal, only when such a peak amplitude exceeds the output amplitude of the peak detector. In the particular example, the peak detector charges up to the quas0reflected amplitude of each of signals 24 and 26, since when either of these signals is received by the detector its output amplitude is lower than the peak amplitude of either of these signals. However, the detector's output is not affected by any one of signals 22, 23, 25 or 27 since, when either one of the latter-mentioned signals is received, the output of the peak detector is greater than the peak amplitude of the signal.

The actual amplitude of the output of the peak detector 12 with respect to a reference potential such as zero is represented by line 35 in line *b* of FIG. 2. Assuming that line 19 is connected to the center of resistor 17, the voltage amplitude on line 19 is 50 percent the voltage amplitude of the peak detector output. The voltage amplitude on line 19 is diagrammed in FIG. 2, line *c*.

Ignoring for a moment the function of the sample and hold unit 18, if line 19 were directly connected to one input of the comparator 14, it should be appreciated that in such a case the amplitude of each input signal would be compared directly with the amplitude on line 19, which for explanatory purposes may be referred to as X. Such amplitude comparisons are diagrammed in FIG. 2, line *d*, wherein the input signals 2—27 are again diagrammed. In FIG. 2, line *d*, lines 41—47 represent the amplitudes of X during the durations of input signals 21—27, respectively.

From the foregoing it should be appreciated that binary 1 output signals are produced by the comparator 14 only in response to input signals 21, 22, 24, 26 and 27, since the amplitude of each of these exceeds the X amplitude with which it is compared. These binary 1 output signals are designated by numerals 51, 52, 54, 56 and 57 in FIG. 2, line *e*. It is apparent that binary 1 output signals are not produced in response to either input signal 23 and 25, since the amplitude of either of these input signals is less than the X amplitude with which it is compared.

A careful observation of FIG. 2, line *d*, reveals that since each input signal is of a finite duration and since during the durations of some of these input signals the X amplitude decreases, the amplitudes of some of the input signals are not compared with fixed, constant amplitudes. This is particularly apparent by the slopes of lines 42 and 47. Although such a characteristic may not be objectionable in many applications, there are some applications in which a comparison of the amplitude of each input signal with an amplitude which does not vary during the comparison duration is required. For example, such a comparison is required in applications in which it is desired to find the real center of the input signal while its amplitude exceeds the amplitude of the X amplitude, with which it is compared. In such a case the X amplitude, representing a threshold amplitude with which the input signal amplitude is compared must remain constant, if the time center is to be located. It is for this purpose that the sample and hold unit 18 is added.

Basically, in the absence of a binary 1 output signal from comparator 14, the unit 18 samples the amplitude on line 19 and supplies it to the input of comparator 14 as the X amplitude. However, as soon as a binary 1 output signal, such as signal 51, is provided by the comparator 14, the unit 14 holds the last sample and supplies this sample to the comparator 14. Thus, in practice, as soon as the leading edge of an input signal has an amplitude which equals or exceeds the X amplitude, a binary 1 level is produced on the comparator output. Consequently, the unit 18 holds the amplitude of the last sample of the amplitude on line 19 so that the input signal, during its entire duration, is compared with a constant X amplitude.

In such a case the amplitudes of signals 21, 22, 24, 26 and 27 are not compared with the X amplitudes, represented by lines 41, 42, 44, 46 and 47, respectively. Rather, they are compared with X amplitudes represented in FIG. 2, line *c*, by dashed lines 61, 62, 64, 66 and 67, respectively. Each of these lines is horizontal, representing a constant amplitude during the entire duration of a different input signal, whose amplitude is compared with the constant amplitude. It should be pointed out that once the output level of comparator 14 returns to a binary 0 level, the unit 18 returns to operate in the sample mode.

Figure 3:
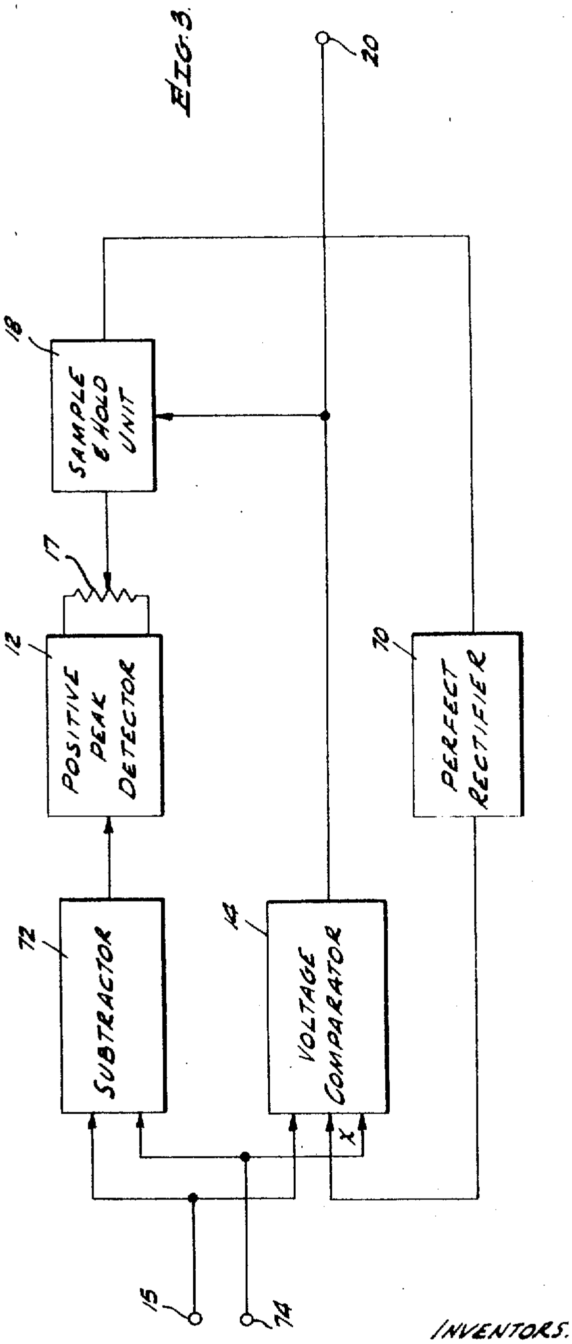
FIG. 3 is a block diagram of another embodiment of the invention.

Due to the switching of the unit 18 between the sample and hold modes, inevitable negative transients are often present at the output of unit 18 when the unit is switched to the hold mode. In order to prevent such negative transients from latching the comparator, and thereby produce erroneous results, a rectifier of the type which employs operational amplifiers is preferably inserted between the output of the unit 18 and the comparator 14. Such a rectifier is designated by numeral 70 in FIG. 3 which represents a preferred embodiment of the discriminator.

In this embodiment which finds particular application when the input signals are provided in a very noisy environment. In such a case the input to the peak detector is not each input signal but rather the output of an analog subtractor 72 which subtracts a preset initial threshold voltage, present at an input terminal 74 from each input signal. Thus, the input to the peak detector is each input signal voltage minus the initial threshold voltage. As shown, the initial threshold voltage is also supplied to the comparator 14. In such an embodiment the comparator compares the amplitude of each input signal with the sum of the amplitudes of the initial threshold voltage and the X amplitude supplied thereto through rectifier 70 from unit 18. Only when the input signal amplitude exceeds the sum of these amplitudes is a binary 1 output signal produced thereby.

Designating the input signal amplitude by I, the initial threshold voltage amplitude by T, the output amplitude of the detector 12 by D, the output amplitude of unit 18 by X, the output of the subtractor 72 may be defined as S where, $S=I-T$. The comparator 14 provides a binary 1 output only when $I>T+X$, while producing a binary 0 71 output when $I<T+X$. As herebefore indicated, X is a selected percentage of D, which in the prior example was assumed to be 50 percent. Clearly X may be selected to be any other percentage of D.

From the foregoing description, and in particular from FIG. 2, lines *d* and *e*, it becomes apparent that by comparing the amplitude of each input signal with a percentage of the output amplitude of the peak detector which is a function of the amplitudes of previously received input signals, input signals of low amplitudes, such as signals 23 and 25, are inhibited from producing corresponding binary 1 output signals. Relating the input signal amplitude to target strength, the novel discriminator enables the selection of strong targets and the rejection of weak targets.

Although particular embodiments of the invention have been described and illustrated herein, it is recognized that modifications and variations may readily occur to those skilled in the art and consequently be interpreted to cover such modifications and equivalents.

What we claim is:

1. A signal amplitude discriminator comprising:
input means at which input signals of varying amplitudes are successively applied;
peak detector responsive to said succession of input signals for providing a peak detector output having an amplitude which is a function of the peak amplitudes of said input signals and a selected rate of discharge;
signal amplitude comparing means for providing an output signal of a first level when the amplitude of an input signal is not less than the amplitude of a selected percentage of the amplitude of the peak detector output at the time said input signal is received by said signal amplitude comparing means; and
hold means responsive to said signal amplitude comparing means output signal of said first level for holding the percentage of the amplitude of the peak detector output which is supplied to said signal amplitude comparing means constant, during the comparison duration with the input signal.

2. The signal amplitude discriminator as defined in claim 1 further including rectifying means disposed between said hold means and said signal amplitude comparing means for inhibiting other than amplitudes of a selected polarity from reaching said signal amplitude comparing means from said hold means.

3. A signal amplitude discriminator comprising:
input means at which input signals of varying amplitudes are successively applied;
peak detector responsive to said succession of input signals for providing a peak detector output having an amplitude which is a function of the peak amplitudes of said input signals and a selected rate of discharge;
signal amplitude comparing means for providing an output signal of a first level when the amplitude of an input signal is not less than the amplitude of a selected percentage of the amplitude of the peak detector output at the time said input signal is received by said signal amplitude comparing means;
said peak detector charging up to a potential substantially equal to the peak amplitude of a first of said input signals with said peak detector discharging at said selected rate and charging up the peak amplitude of any subsequent signal only if the peak amplitude of the subsequent input signal exceeds the amplitude of said peak detector output; and hold means responsive to said signal amplitude comparing means output signal of said first level for holding the percentage of the amplitude of the peak detector output which is supplied to said signal amplitude comparing means constant during the comparison duration with the input signal and further including rectifying means disposed between said hold means and said signal amplitude comparing means for inhibiting other than amplitudes of a selected polarity from reaching said signal amplitude comparing means from said hold means.

4. A first input terminal at which input signals are applied;

a second input terminal at a fixedly selected threshold level;

first circuit means coupled to said first and second input terminals for providing a first signal for each input signal only when the input signal amplitude at said first input terminal exceeds said threshold level, the amplitude of said first signal being a function of the amplitudes of the input signal and said selected threshold level;

peak detector means responsive to each first signal for providing a peak detector output whose amplitude is a function of the peak amplitudes of said first signals and a preselected fixed discharge rate of said peak detector; and signal amplitude comparing means coupled to said first and second input terminals and to which a selected percentage of the amplitude of the peak detector output is applied, for providing an output signal of a first level only when the amplitude of an input signal at said first terminal is not less than the sum of the amplitudes of said selected percentage of the amplitude of the peak detector output and the threshold level at said second input terminal.

5. The signal amplitude discriminator as defined in claim 4 further including hold means responsive to said signal amplitude comparing means output signal of said first level for holding the percentage of the amplitude of the peak detect output which is supplied to said signal amplitude comparing means constant during the comparison duration with the input signal.

6. The signal amplitude discriminator as defined in claim 5 further including rectifying means disposed between said hold means and said signal amplitude comparing means for inhibiting other than amplitudes of a selected polarity from reaching said signal amplitude comparing means from said hold means.

7. The signal amplitude discriminator as defined in claim 4 wherein said peak detector charges up to a potential substantially equal to the peak amplitude of a first of said input signals with said peak detector discharging at said selected rate and charging up to the peak amplitude of any subsequent input signal only if the peak amplitude of the subsequent input signal exceeds the amplitude of peak detector output.

8. The signal amplitude discriminator as defined in claim 6 further including hold means responsive to said signal amplitude comparing means output signal of said first level for holding the percentage of the amplitude of the peak detector output which is supplied to said signal amplitude comparing means constant during the comparison duration with the input signal and further including rectifying means disposed between said hold means and said signal amplitude comparing means for inhibiting other than amplitudes of a selected polarity from reaching said signal amplitude comparing means from said hold means.